United States Patent
Owen

[11] 3,741,060
[45] June 26, 1973

[54] TRIMMING FOAM LAMINATES

[75] Inventor: Ian Thornton Owen, Stockton-on-Tees, England

[73] Assignee: Imperial Chemical Industries, Limited, London, England

[22] Filed: May 18, 1971

[21] Appl. No.: 144,535

[30] Foreign Application Priority Data
June 4, 1970 Great Britain................... 26,994/70

[52] U.S. Cl....................... 83/368, 83/428, 83/433, 83/504
[51] Int. Cl............................................... B26d 5/00
[58] Field of Search...................... 83/368, 428, 433, 83/504

[56] References Cited
UNITED STATES PATENTS
| | | | |
|---|---|---|---|
| 1,133,297 | 3/1915 | Lewis.................................. | 83/368 |
| 3,386,323 | 6/1968 | Dovey................................. | 83/470 |
| 3,036,483 | 5/1962 | Porter................................. | 83/368 |
| 3,176,567 | 4/1965 | McCormick et al................. | 83/368 |
| 3,260,142 | 7/1966 | Nitchie et al....................... | 83/368 |
| 3,185,010 | 5/1965 | Printz et al........................ | 83/504 |
| 2,910,122 | 10/1959 | Anderson et al................... | 83/368 |

FOREIGN PATENTS OR APPLICATIONS
955,552   4/1964   Great Britain....................... 83/368

Primary Examiner—Gerald A. Dost
Attorney—Cushman, Darby and Cushman

[57] ABSTRACT

Apparatus for trimming a rigid polyurethane foam laminate comprising a frame freely movable laterally, a pair of carriages clamped to the frame a preselected distance apart and movable with the frame, cutting means mounted upon each carriage and movable therewith, each cutting means being mouunted upon its respective carriage a preselected distance from the other and from the adjacent longitudinal edge of the laminate, means for continuously sensing lateral movement of the laminate and means responsive to lateral movement of the laminate for causing corresponding lateral movement of the frame, the carriages and their respective cutting means.

2 Claims, 3 Drawing Figures

Inventor
IAN THORNTON OWEN

By Cushman, Darby & Cushman
Attorneys

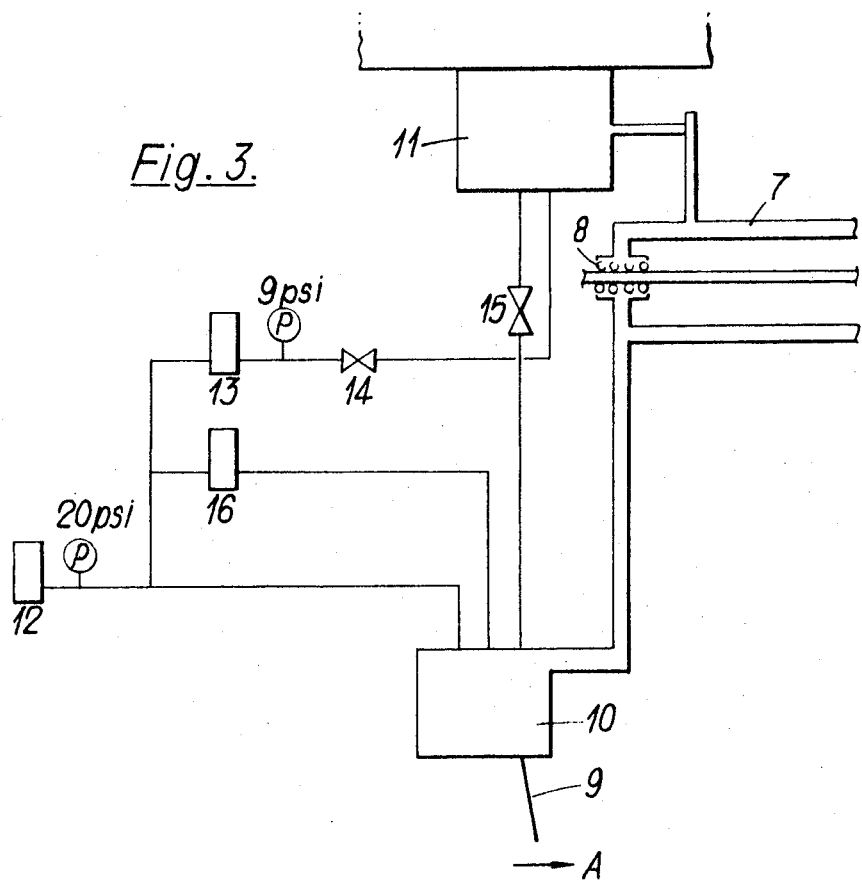

TRIMMING FOAM LAMINATES

The present invention relates to a foam laminate comprising a layer of a rigid foamed synthetic plastics material (for example, foamed polystyrene, foamed polyurethane) sandwiched between and bonded to upper and lower facings. Such foam laminates are already well-known and many processes for their manufacture have already been proposed, for example in British Pat. Nos. 997086, 1023164, 1098472, 1098473, 1053192 and 1113959, U.S. Pat. Nos: 3369065 and 3537929, and Canadian Pat. Nos: 717514 and 777759, among many others.

The invention is particularly applicable to a foam laminate as described in the immediately preceding paragraph, wherein the upper facing is an easily-cut flexible sheet (e.g. of paper) and the bottom facing sheet is either:

a. also an easily-cut flexible sheet (e.g. of paper); or
b. a previously-prepared flexible, rigid or semi-rigid sheet of material (e.g. of metal, wood, board) of preselected width, which may be substantially plane or profiled; during manufacture of the laminate, this latter sheet lies substantially centrally disposed upon an easily-cut flexible sheet (e.g. of paper) — i.e. with its longitudinal edges each substantially equidistant from the adjacent longitudinal edge of the underlaying easily-cut flexible sheet which, if desired, may be a strippable sheet which can be stripped off the bottom of the laminate after manufacture.

To avoid confusion, the bottom easily-cut flexible sheet referred to in (a) and (b) above will hereinafter be termed "the carrier sheet" (though it will be appreciated that it is not necessarily made of paper), the term "lower facing" will hereinafter be used to denote the previously-prepared flexible, rigid or semi-rigid sheet of preselected width referred to in (b) above (whether or not the carrier sheet is still attached thereto or has been stripped therefrom). A foam laminate as described in this paragraph is hereinafter referred to as "a foam laminate of the kind described."

When a foam laminate of the kind described issues from the laminating machinery, its longitudinal edges require trimming for one or more of the following reasons:

1. Its edges are not squared-off;
2. The laminate must be of constant predetermined width to meet product requirements;
3. Where the laminate includes a lower facing (as described in (b) above), it is necessary to trim the laminate in substantially exact alignment with the longitudinal edges of the lower facing.

It might be thought that these requirements could be met by positioning, near each longitudinal edge of the laminate, a circular saw (or like cutting means) for trimming the edges longitudinally; that each saw might be positioned sufficiently far from the adjacent longitudinal edge of the carrier sheet to ensure that the laminate edges are in fact, squared off; that each saw might be positioned at the same predetermined distance from the adjacent longitudinal edge of the carrier sheet (i.e. the saws being positioned at a predetermined distance from one another) to ensure that the trimmed laminate is of a constant predetermined width; or, as a variant of the latter arrangement, where the laminate includes a lower facing from which the carrier sheet is stripped off, that each saw might be positioned in registration with the corresponding longitudinal edge of the lower facing.

However, matters are not quite so simple, since in processes (particularly in continuous processes) for the production of foam laminates of the kind described, the carrier sheet (and, therefore, the lower facing) is liable to wander from side to side; consequently if the position of the saws is fixed, a great deal of the product will be unsatisfactory and will have to be discarded and furthermore, if the lower facing is made of metal there is the possibility of damage to the saws.

We have now overcome these difficulties by mounting the saws so that they are free to move laterally with respect to the longitudinal direction of travel of the carrier sheet or lower facing; responsive to the wander of the carrier sheet or lower facing, the saws are also caused to wander in the same direction as, to the same extent as, and substantially simultaneously with, the carrier sheet or lower facing, so that the saws always cut the foam laminate at a preselected distance from each longitudinal edge of the carrier sheet, or in registration with each longitudinal edge of the lower facing.

In one embodiment of the present invention, where either there is no lower facing or, if there is, the carrier sheet is not stripped off the lower facing, we accordingly provide apparatus for trimming a foam laminate of the kind described, comprising a frame freely movable laterally with respect to the longitudinal direction of travel of the carrier sheet, a pair of carriages adapted to be clamped to the frame at a preselected distance apart and movable with the frame, cutting means mounted upon each carriage and movable therewith, each cutting means being mounted upon its respective carriage at a preselected distance from the other and from the adjacent longitudinal edge of the carrier sheet, for example in registration with the adjacent longitudinal edge of the lower facing (if present), means for continuously sensing lateral movement of the carrier sheet, and means responsive to lateral movement of the carrier sheet, for causing corresponding lateral movement of the frame and, therefore, of the carriages and their respective cutting means.

In another embodiment of the invention, where there is a lower facing and the carrier sheet is stripped off the lower facing before trimming, we provide apparatus for trimming a foam laminate of the kind described, comprising a frame freely movable laterally with respect to the longitudinal direction of travel of the lower facing, a pair of carriages adapted to be clamped to the frame at a preselected distance apart and movable with the frame, cutting means mounted upon each carriage and movable therewith, each cutting means being mounted upon its respective carriage at a preselected distance from the other and in registration with the adjacent longitudinal edge of the lower facing, means for continuously sensing lateral movement of the lower facing, and means responsive to lateral movement of the lower facing for causing corresponding lateral movement of the frame and, therefore, of the carriages and their respective cutting means.

Referring to the immediately preceding paragraph, in the special case where the lower facing is profiled, the sensing means is connected to a wheel which is adapted to engage (or be engaged by) the profile, and to track it and move laterally with it, thereby indicating to the sensing means lateral movement of the lower facing.

Each cutting means is preferably a vertically retractable, motor-driven circular saw. It will be appreciated that, prior to operation, the carriages can be adjusted manually to preselected positions upon the frame, and the cutting means, e.g. the saws, to preselected positions upon their respective carriages, depending on the final desired width of the laminate.

The invention is hereinafter described with reference to the accompanying drawings, wherein:

FIG. 3 is a circuit diagram illustrating one method of controlling or adjusting, pneumatically, the position of the saws relative to the longitudinal edges of the carrier sheet and/or lower facing.

Figure 1:
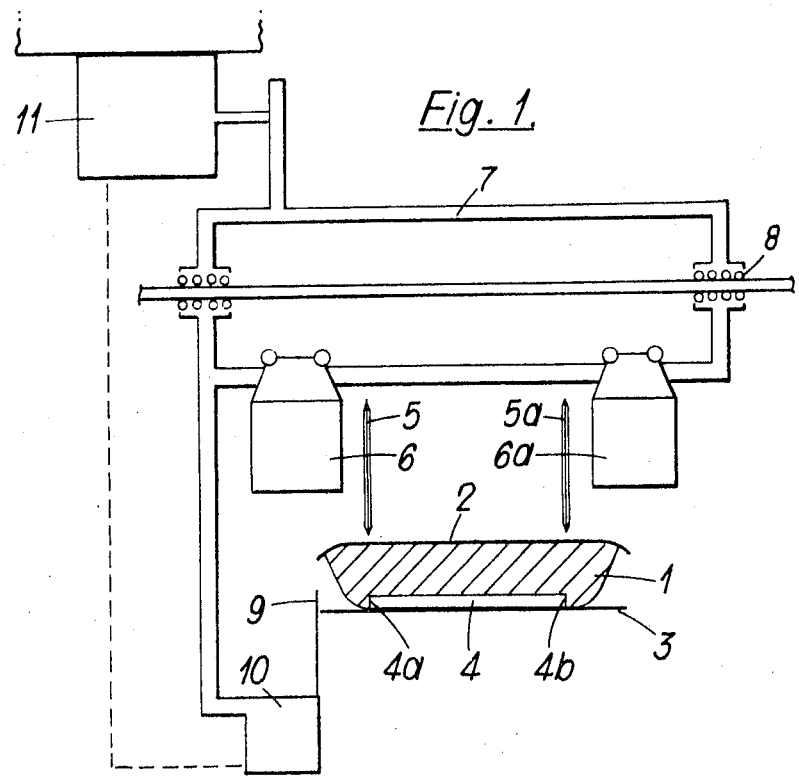
FIG. 1 is a diagrammatic view of one embodiment of the apparatus according to the invention.

Referring to FIG. 1 of the drawings, there is illustrated a foam laminate comprising a layer 1 of a rigid foamed synthetic plastics material (e.g. foamed polyurethane) sandwiched between an upper paper facing 2 and a lower carrier paper sheet 3. In the embodiment illustrated, a lower facing 4 (e.g. a plane metal sheet) rests substantially centrally upon the carrier sheet 3, and it is desired to cut the laminate accurately along the longitudinal edges 4a, 4b, of the lower facing 4. It will be appreciated that even if the laminate did not include the lower facing 4, it would still be necessary to trim both longitudinal edges not only to square them off but also in order to obtain a finished laminate of constant predetermined width. Unfortunately, it is not possible to do this using fixed cutting means (e.g. circular saws) since, as previously explained, the carrier sheet 3 tends to wander transversely back and forth.

According to our invention, this difficulty is overcome by providing a pair of vertically retractable, "floating," motor-driven circular saws 5, 5a, which are also free to wander transversely back and forth with the carrier sheet 3. The saws 5, 5a, are carried by movable carriages 6, 6a, which are adapted to be clamped at a preselected distance apart, upon a frame 7 which is mounted upon low-friction linear ball races 8 and is therefore also free to wander transversely back and forth with the carrier sheet 3. In fact, the saws 5, 5a are first secured manually a preselected distance apart (in the present case a distance equal to the width of the lower facing 4) and thereafter it is transverse movement of the frame 7 (and, therefore, of the carriages 6, 6a) which causes transverse movement of the saws, 5, 5a.

The position of a longitudinal edge of the carrier sheet 3 is continuously sensed by a sensing arm 9 spring-loaded thereagainst; any transverse movement of the carrier sheet is immediately detected and measured by the sensing arm 9 which moves therewith. This information is fed back, through a positioner 10, to a double-acting cylinder 11 which produces a force which causes the frame 7 (and consequently the saws 5, 5a) to move in the same direction and to the same extent as the continuously-sensed longitudinal edge of the carrier sheet 3. As a result, the saws 5, 5a are always at a constant distance from the longitudinal edges of the carrier sheet 3 (or, to put it another way, are always in registration with the longitudinal edges of the lower facing 4). The double-acting cylinder 11 may incorporate a "BELLOPHRAM" rolling diaphragm seal to reduce friction.

Figure 2:
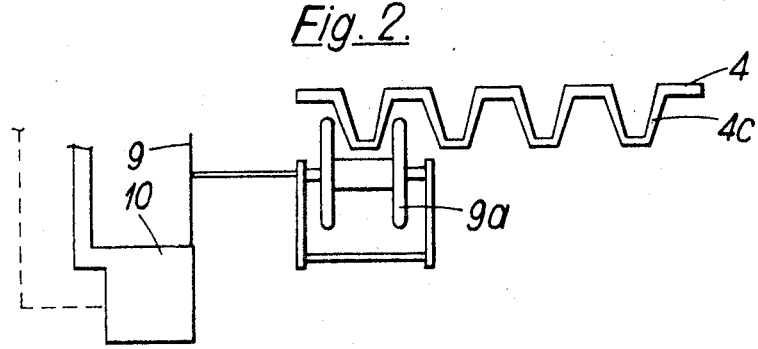
FIG. 2 is a diagrammatic view of part of another embodiment of the apparatus according to the invention.

In the embodiment illustrated in FIG. 2, it will be observed that the lower facing 4 is profiled, with downwardly-extending crenellations 4c. In this case, the sensing arm 9 is connected to a wheel 9a which engages (or is engaged by) and tracks one of the crenellations 4c and is free to move laterally with it, thereby indicating lateral movement of the lower facing 4 to the sensing arm 9 which feeds this information to the positioner 10 and cylinder 11, as in the immediately preceding paragraph.

In the two immediately preceding paragraphs we have referred only briefly to how the information derived from the sensing arm 9 is used to cause corresponding movement of the frame 7 and saws 5, 5a. It is believed that persons skilled in the art will be able to devise various hydraulic, pneumatic, electric and/or fluidic systems for carrying out this last step. We ourselves prefer to use a pneumatic position control system (for example as illustrated in FIG. 3) for reasons of convenience, simplicity and low cost.

The pneumatic position control system illustrated in FIG. 3 is actuated by an air supply (e.g. of about 20 p.s.i.) namely regulator 12.

An accuracy of about 0.010 to 0.030 ins is required of the position control system; fast response is not essential, but the force available to actuate the frame 7 must be limited so that the saws 5, 5a, do not stall due to excessive side-load. The frame 7 is therefore preferably supported by the low-friction linear ball races 8 in order to give the lowest possible friction and highest possible sensitivity to the position control system. Very interestingly, we have observed that the natural vibrations of the saw motors causes a very slight vibration in the frame 7, which effectively compensates even for the low-friction effect of the linear ball-races 8.

The frame 7 is moved by the double-acting cylinder 11, preferably using a rolling diaphram seal to reduce friction. Force limiting is applied by limiting the pressures which can be applied to the cylinder 11. One side of the cylinder 11 is connected to a source of constant pressure (e.g. about 9 p.s.i.) namely regulator 13 through a stabilising restriction such as a needle valve 14; its other side is connected to the output of the positioner 10, also through a restriction such as a needle valve 15. The positioner 10 is conveniently a standard valve positioner. With the sensing arm 9 in a central position, the output pressure from the positioner 10 is arranged to be equal to the constant pressure applied to the other side of the cylinder 11, so that the frame 7 will not move. Any deviation of the sensing arm 9 will alter the output pressure of the positioner 10, which will result in a force being applied by the cylinder 11, in such a direction as to move the frame 7, with the positioner 10, in the direction which will restore the sensing arm 9 to its original central position.

The arrangement thus forms a closed-loop control system with direct position feedback.

In the circuit diagram shown in FIG. 3, regulator 13 provides the constant pressure to one side of the cylinder 11. In the simplest system, the illustrated regulator 16 would be omitted and the "INSTRUMENT" input to the positioner 10 would be taken to the output of regulator 13. A further regulator may be fitted to provide a zero or initial setting adjustment in a convenient form.

I claim:

1. Apparatus for trimming a foam laminate of the kind comprising a layer of a rigid foamed synthetic plastics material sandwiched between and bonded to an upper easily-cut flexible sheet and a lower easily-cut flexible carrier sheet, said apparatus comprising a frame freely movable laterally with respect to the longitudinal direction of travel of the carrier sheet, a pair of carriages adapted to be clamped to the frame at a preselected distance apart and movable with the frame, cutting means mounted upon each carriage and movable therewith, each cutting means being mounted upon its respective carriage at a preselected distance from the other and from the adjacent longitudinal edge of the carrier sheet, sensing means for continuously sensing lateral movement of the carrier sheet comprising a sensing arm spring-loaded against a longitudinal lower edge of the laminate, the sensing arm being movable therewith and being adapted to detect and measure transverse movement of the laminate, and a pheumatic position control system for laterally moving the frame, carriages and cutting means responsive to movement of the sensing means comprising a closed-loop control system having a positioner connected to one side of a double-acting pneumatic cylinder, the other side of the double-acting cylinder being connected to a regulator, and the regulator being connected back to the positioner to provide a feed-back system.

2. Apparatus for trimming a foam laminate of the kind comprising a layer of a rigid foamed synthetic plastics material sandwiched between and bonded to an upper easily-cut flexible sheet and a lower facing which is profiled, said apparatus comprising a frame freely movable laterally with respect to the longitudinal direction of travel of the lower facing, a pair of carriages adapted to be clamped to the frame at a preselected distance apart and movable with the frame, cutting means mounted upon each carraige and movable therewith, each cutting means being mounted upon its respective carriage at a preselected distance from the other and in registration with the adjacent longitudinal edge of the lower facing, sensing means comprising a spring loaded arm for continuously sensing lateral movement of the lower facing, a wheel adapted to engage the profile of the lower facing connected to the sensing means to track and move laterally with the profile and to indicate to the sensing means lateral movement of the lower facing, and a pneumatic position control system for laterally moving the frame, carriages and cutting means responsive to movement of the sensing means comprising a closed-loop control system having a positioner connected to one side of a double-acting pneumatic cylinder, the other side of the double-acting cylinder being connected to a regulator, and the regulator being connected back to the positioner to provide a feed-back system.

* * * * *